United States Patent [19]
Phung

[11] Patent Number: 5,582,556
[45] Date of Patent: Dec. 10, 1996

[54] VARIABLE RATIO TRANSMISSION

[76] Inventor: Viet Phung, 79A Nanyang View, Singapore, Singapore, 2263

[21] Appl. No.: 434,184

[22] Filed: May 3, 1995

[51] Int. Cl.⁶ .............................. F16H 1/32; F16H 29/04
[52] U.S. Cl. .............................................. 475/166; 74/117
[58] Field of Search ........................ 74/86, 117; 475/165, 475/166; 477/43

[56] References Cited

U.S. PATENT DOCUMENTS

| | | | |
|---|---|---|---|
| 1,771,807 | 7/1930 | Mitchell | 475/166 |
| 3,227,004 | 1/1966 | Orain | 475/166 |
| 4,515,028 | 5/1985 | Vanderlinden et al. | 475/166 |
| 4,644,810 | 2/1987 | Vanderlinden et al. | 475/166 |

FOREIGN PATENT DOCUMENTS

| | | | |
|---|---|---|---|
| 643321 | 9/1928 | France | 74/117 |
| 1184998 | 10/1985 | U.S.S.R. | 475/166 |
| 1613750 | 12/1990 | U.S.S.R. | 475/166 |

*Primary Examiner*—Khoi Q. Ta
*Attorney, Agent, or Firm*—Foley & Lardner

[57] ABSTRACT

A variable speed transmission has a gyratory collar element and a conical element engaged over a portion of their respective surfaces through a friction material. The collar moves toward the base of the cone to increase the gear ratio. Movement of the collar may be controlled manually or automatically using sensors of speed and/or torque. The device may also serve as a clutch by withdrawing the collar from contact with the cone.

16 Claims, 7 Drawing Sheets

VARIABLE RATIO TRANSMISSION

BACKGROUND OF THE INVENTION

1. Field of the Invention

The invention is a device for the transmission of torque wherein the input element and the output element are in linear alignment. The device provides for variable, as opposed to stepwise, adjustment of the relative rates of rotation of the input and output elements. The preferred use for the device is as a variable speed transmission. The primary components of the device are a gyratory element or collar which oscillates but does not rotate and a rotating element which contacts the gyrating collar on a portion of, but not all of, its external or internal surface.

2. Prior Art

When a source of power is used to perform a task, it is often necessary to connect the power source to an element which is being driven through a device which changes the amount of torque and/or the speed of rotation so as to adapt the characteristics of the power source to the demands of the driven element. The device is known generically as a transmission. Historically, transmissions have employed either gears, pulleys or pumping devices. When gears are used, only specific ratios of input to output are available. To connect the power source to the transmission, a separate clutch is often required. Pulleys can be connected by belts and can provide fixed or variable ratios. Pulleys are limited in the amount of power which can be put through and have a speed ratio of no more than 6:1. Pumped transmissions are inefficient, complicated and often difficult to maintain. There exists a need for a reliable mechanical transmission which has a variable ratio, a very wide gearing range, is compact, easy to maintain and does not require a separate clutch.

Grant, U.S. Pat. No. 3,304,808, discloses a "gerotor" type reduction and reversing gearbox which operates at a fixed ratio and which has input and output shafts linearly arranged. Sfredda, U.S. Pat. No. 3,530,742 describes a variable ratio, planetary type transmission which employs a roller engaging a conical element connected to an output shaft. The power throughput is limited by the size of the roller and the direction of rotation of input and output shafts is reversed.

BRIEF DESCRIPTION OF THE INVENTION

According to this invention, two shafts which are aligned linearly, carry power into and out of the transmission device. For convenience, the shafts are called input and output, it being understood that either may be connected to a driving element or a driven element. The device consists of a circular gyratory collar element and a conical rotating element which are in contact with each other over a portion, but not all, of their adjacent surfaces. Linear movement of the gyratory element relative to the conical element allows for variation in the effective gear ratio. Withdrawal of the gyratory element from contact with the conical element disengages the transmission, equivalent to throwing out a clutch.

DETAILED DESCRIPTION OF THE INVENTION

The transmission device according to this invention provides a variable ratio of input to output revolution rate. It is a "seamless" transmission which does not have discrete steps as may be found in traditional cut gear transmissions. The device may be employed in a "stand alone" mode, or may be coupled with a clutching device or with another gear reduction device. Size is not a limitation, although the materials used in the construction of the device must be selected upon the basis of the size of the device and the power which is being put through the device. The applications may range from a child's plastic toy to a full size delivery truck.

The figures show preferred embodiments, wherein the input is transmitted through a gyratory element which travels about a conical element. It should be obvious to a person familiar with mechanical transmissions that the gyratory element may be smaller than the conical element.

An important design concept of the invention is that the input and output shafts of the device are aligned longitudinally. The shafts are not merely parallel as is found in traditional gearboxes. Like a planetary transmission, the device operates "in line." Unlike a planetary transmission, the effective gear ratio is variable.

The transmission device may be manually adjusted to select an effective ratio or controlled through a lever or screw arrangement which advances and withdraws the gyratory element. In preferred embodiments, the advancement and withdrawal of the gyratory element is controlled by a servo system which is responsive to the sensed torque and/or rpm of the respective shafts. An appropriate CPU is used to process the signals from various sensors and to control the effective gear ratios according to an embedded program or a ROM.

A particularly advantageous application of the inventive concept is the use of the transmission device in conjunction with an electric motor in a road vehicle. Electric cars, trucks and buses, termed "zero emissions vehicles" have been mandated in some political jurisdictions as a way to reduce hazardous air pollutants. Unfortunately, as of the time when this invention was made, suitable batteries for extended use are not available at a reasonable cost. One promising method for extending the driving range of an electric vehicle is the use of regenerative braking, running the motor as a generator or alternator to slow the vehicle. When the sensed movement of the brake pedal is input into the control circuitry which adjusts the effective gear ratio of the device according to this invention, the generator or alternator may be driven to the maximum rpm consistent with the driving condition. The shedding of heat through friction braking can be minimized.

An alternative to using the motor as a generator or alternator during braking is to store energy in a fly wheel. Mechanical, hydraulic and electro-mechanical devices for storage and retrieval of kinetic energy in a fly wheel are well known as efficient devices for the quick storage and recovery of energy. Because the kinetic energy is proportional to the square of the gear ratio and high gear ratios are quickly achieved in this transmission, transfer of energy to the fly wheel is especially effective.

The first embodiment, which is the basic concept of the transmission, is illustrated in FIGS. 1–4.

Figure 1:
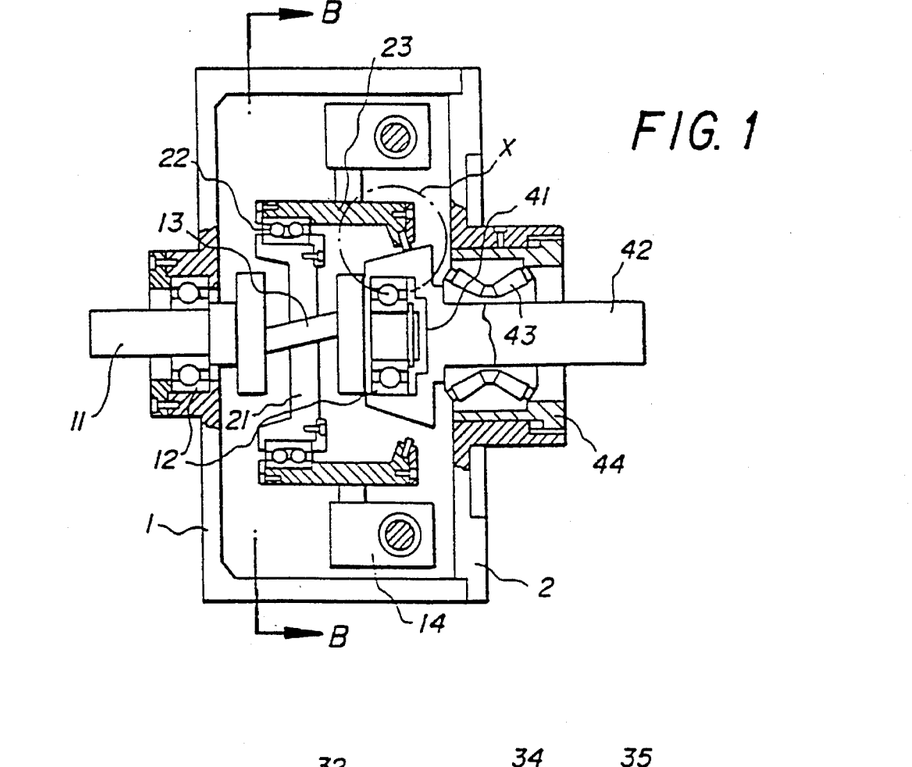
FIG. 1 is a sectional side view of the transmission according to this invention.
Figure 2:
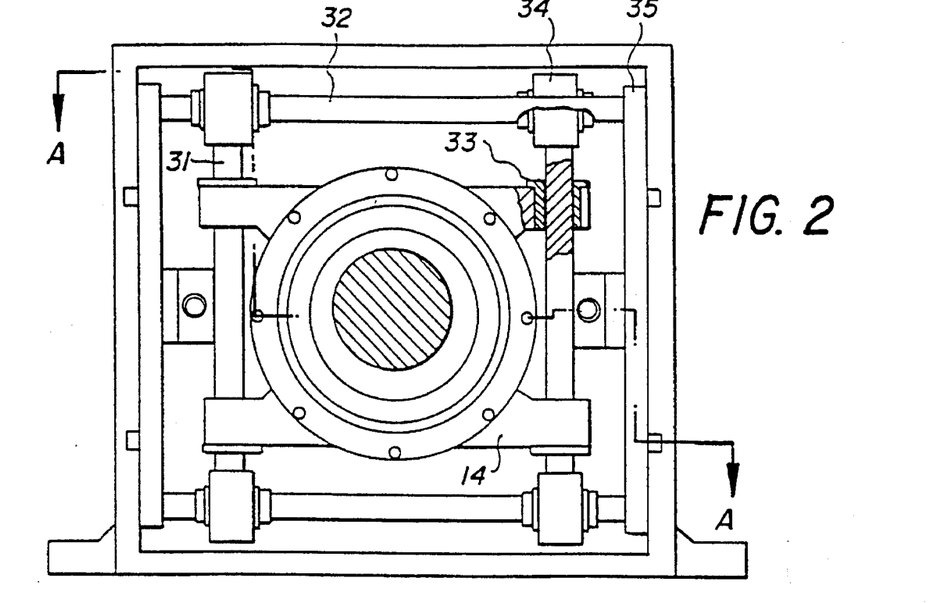
FIG. 2 is a section of FIG. 1 along line BB.

The transmission device is housed in a casing 1 closed by end plate 2, as shown in FIG. 1. Gyratory element 23 is mounted in frame 14 which carries bearing 33, preferably linear bearings through which pass guide rails 31. At each end of guide rails 31 is a linear bearing 34 through which pass guide rails 32. Guide rails 32 are carried at each end in sliding frame 35 which is slidably mounted in grooves in the side of case 1.

As can be seen in FIG. 1, the gyratory collar element 23 is actuated by rotating shaft element 11, which may be the input shaft. Shaft 11 penetrates casing 1 and is cradled in bearings 12, which are shown as caged ball bearings but may be a bushing or other appropriate friction reducing device. For very high speed operation, air bearings are also suitable.

Projecting from element 11, at an angle to the centerline of element 11, is inclined rod element 13. Element 13 may be tubular or solid. Element 13 may be integral with shaft 11, or it may be attached to element 11 by splines, bolts through a flange, or by an adhesive, depending upon the strength requirements dictated by the amount of power being transmitted. More than one element 13 may be employed. Element 13 passes through offset plate 21.

Collar 23 is mounted about offset plate 21 through bearings 22, which are shown as but not limited to caged ball bearings. At the distal end of rod element 13 is a flange carrying a projection which extends into conical element 41. A pilot bearing is employed in the preferred embodiment.

Conical element 41 may be an integral part of shaft 42 or it may be splined, sweat onto, glued to or keyed onto shaft 42. An anti-friction element 43, typically a bearing, constrains shaft 42. The bearing may be a thrust bearing, as indicated in FIG. 1. Roller, needle and journal bearings are suitable. It is preferred in some applications that bearings 43 be urged toward conical element 41 by a biasing device such as a Belville spring held in place by a locking nut or circlip 44. A suitable oil or grease seal protects the bearings.

The above-described elements are formed from materials suitable for the amount of power which is to be transferred through the transmission device. Ferrous and non-ferrous metals, plastics (including reinforced plastics) and ceramics are suitable. The only limitations are cost and power throughput.

The gyratory element and the conical element are connected through a friction material 24. As with all other components of the invention, the friction material is selected based upon design power throughput. For low power devices, a rubber O-ring may be sufficient. For an automobile or truck, materials used for clutch facings and brake linings may be preferred. Carbon fibre reinforced plastic is particularly preferred where light weight is required and severe conditions are expected. The friction material must be compatible with the surface 45 of the conical element. The relationship of the friction material to the conical surface must provide low slippage in the direction of rotation while allowing the friction material to walk up and down the ramp of the conical element so as to effect gear ratio variation without discernable steps.

Figure 4:
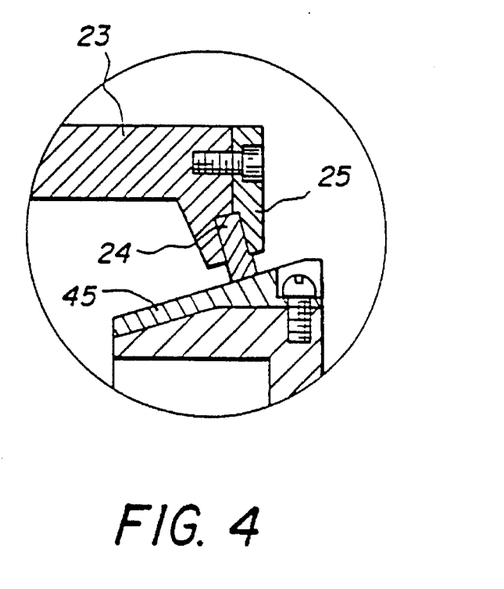
FIG. 4 is a detail of one mating arrangement of gyratory collar and conical element shown in X of FIG. 1.

The friction material 24 may be mounted into the collar 23 in any number of ways. As illustrated in FIG. 4, flange 25 is bolted directly into collar 23 to wedge friction element 24 into position. Friction element 24 may be solidly mounted, as shown in the figure. Alternatively, it may be urged toward the surface 45 of the conical element 41 by one or more springs, or by hydraulic or pneumatic pressure. Surface 45 may be replaceable, as shown in FIG. 4. The transmission may be of the wet or dry type, wet being preferred as size and power through put increase.

Figure 10:
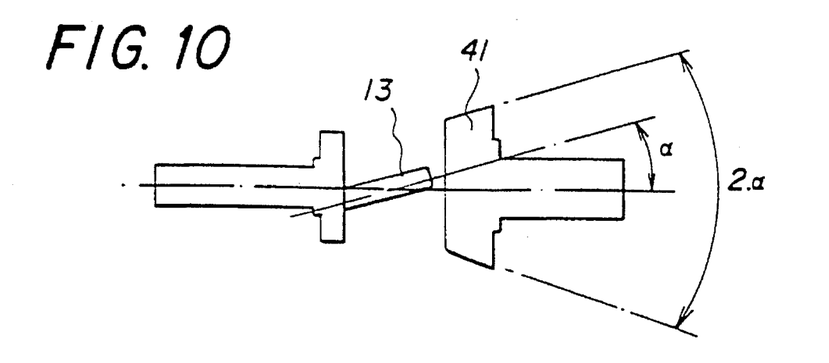
FIG. 10 shows the relationship of the angle of the inclined rods to the surface of the rotating conical element.
Figure 11A:
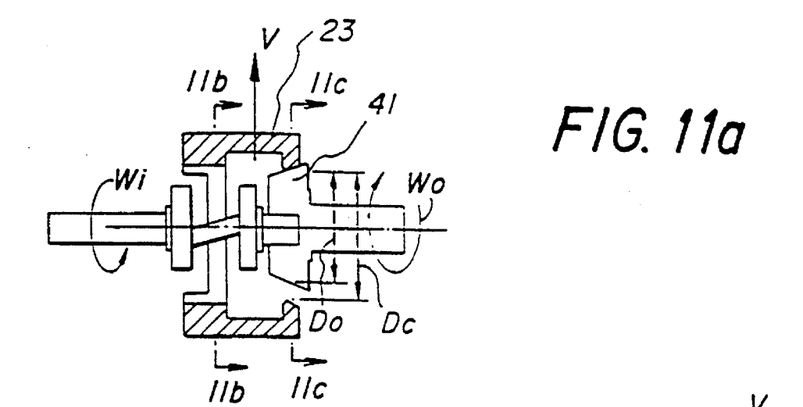
FIGS. 11a, 11b and 11c show the dimensions used in calculating the effective gear ratio of the device according to this invention.
Figures 11B, 11C:
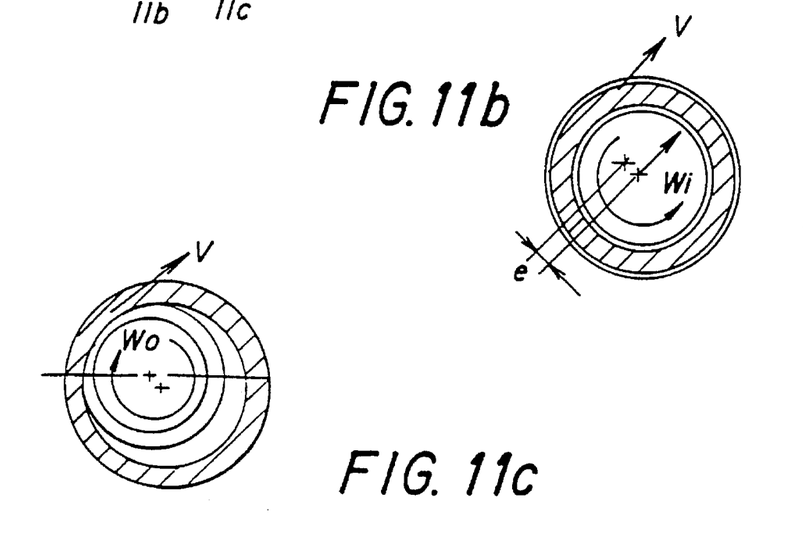

According to a preferred embodiment, the angle of inclination of the angled element 13 is equal to one-half the included angle of the conical friction surfaces as shown in FIG. 10. As a result, contact may be maintained between the friction material and the surface of the cone. Referring to FIGS. 11a through 11c, if the input shaft rotates at an angular velocity Wi, the collar moves at an instantaneous linear velocity V:

$$V = Wi \cdot e \tag{1}$$

wherein e is the eccentricity as defined below. Therefore, the cone rotates at an angular velocity Wo defined by:

$$Wo = \frac{V}{(Do/2)} \tag{2}$$

wherein Do is the effective diameter of the cone at the point of contact.

The eccentricity e is defined as:

$$e = \frac{(Dc - Do)}{2} \tag{3}$$

wherein Dc is the diameter of the collar.

The gear ratio G for the transmission device, obtained by combining the equations (1), (2) and (3) is:

$$G = \frac{-1}{[1 - Do/Dc]}$$

The desired gear ratios are obtained by selection of suitable diameters for the collar and cone and by the length of the conical portion. The actual diameters selected are limited by the power which can be transmitted through the contact of the friction material and the cone.

Figure 3:
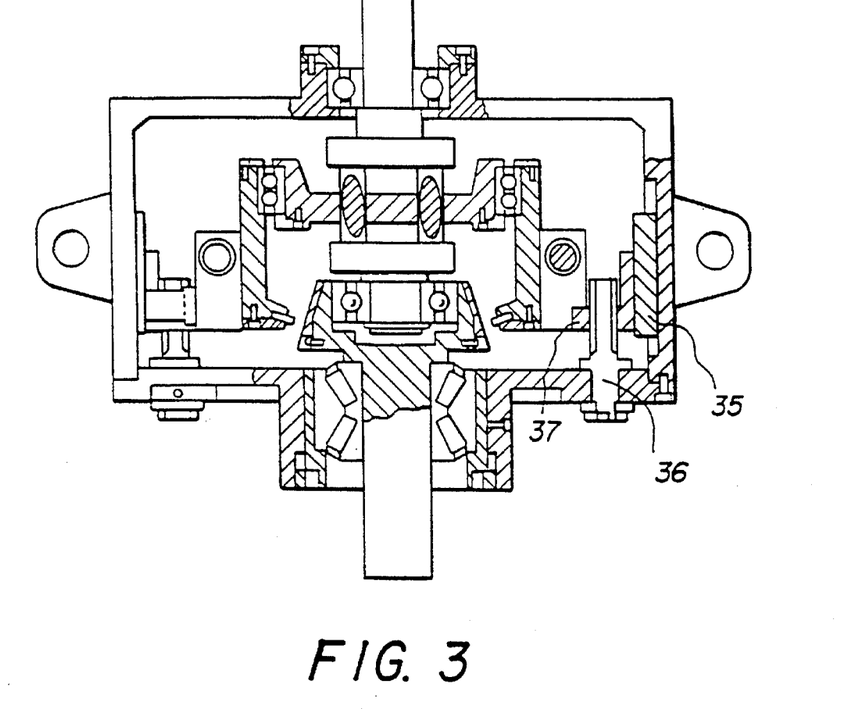
FIG. 3 is a section of FIG. 2 along line AA.

As shown in FIG. 3, the gear ratio may be selected and set using an adjusting screw 36 threaded through a key connecting rails 37 to sliding frame 35. Alternative methods to select and set the ratio include a rod inserted in the same place as screw 36 and an external lever connected to sliding frame 37.

Figure 5:
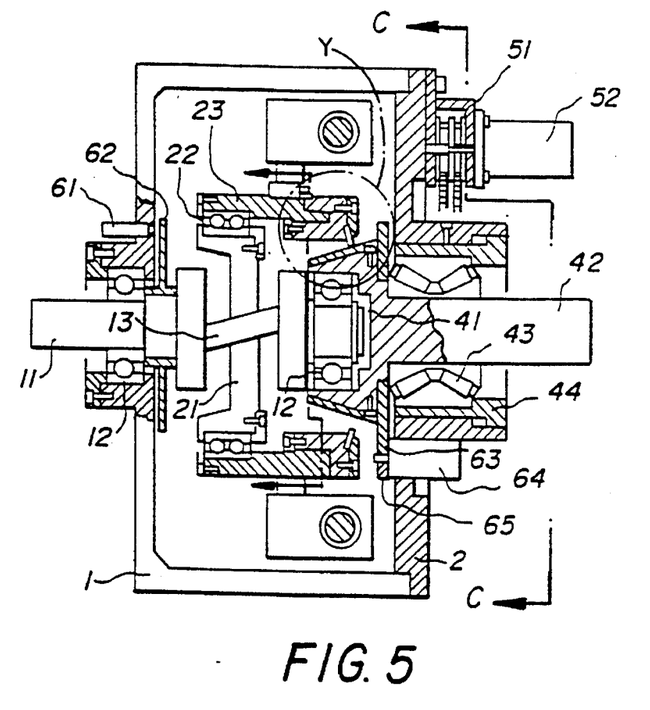
FIG. 5 illustrates one embodiment for the adjustment of the effective gear ratio of the transmission.
Figure 6:
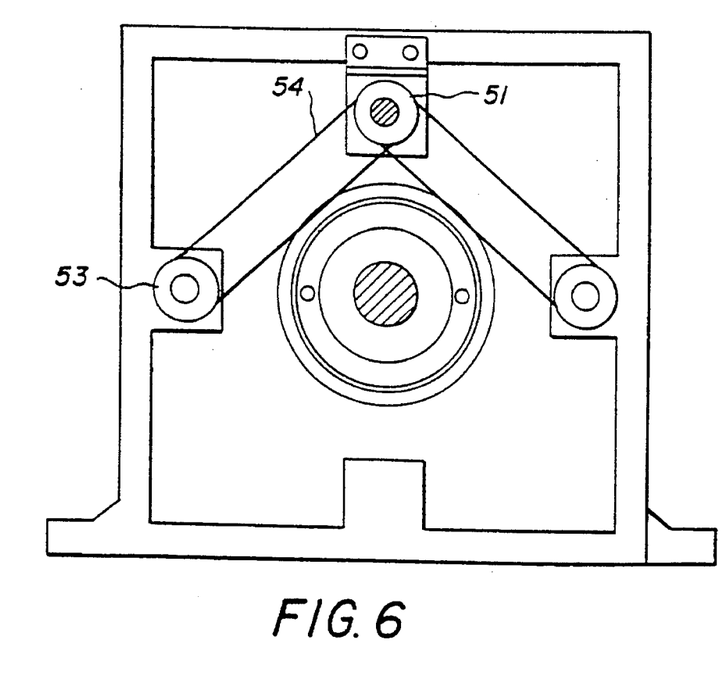
FIG. 6 is a section of FIG. 5 along line CC.

A preferred embodiment is that shown in FIG. 5, wherein a stepper motor 52 is mounted on a housing 51 bolted to end plate 2. As shown in FIG. 6, the drive from the stepper motor is connected to screws such as 36 using a drive belt or chain 54 and pulleys or sprockets 53. Not shown but obvious would be a tensioning device such as an idler pulley. As an alternative, a gear train also may be used.

In certain applications, it may be preferred to move the frame 14 by replacing screw 36 with an hydraulic or pneumatic slave cylinder.

Figure 8:
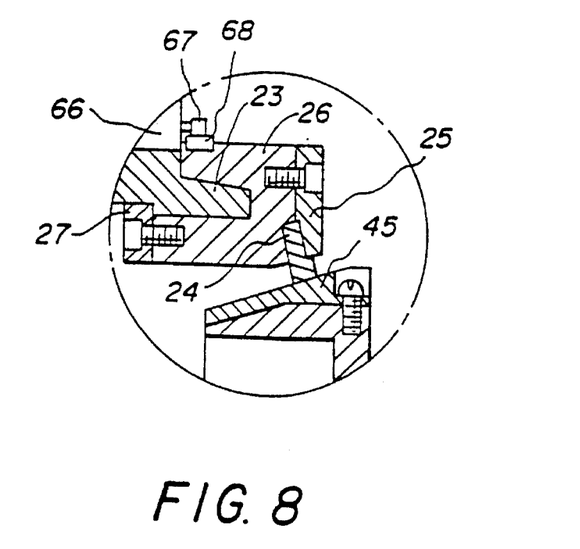
FIG. 8 shows the incorporation of a torque ring into the gyratory collar shown in Y of FIG. 5.
Figure 8A:
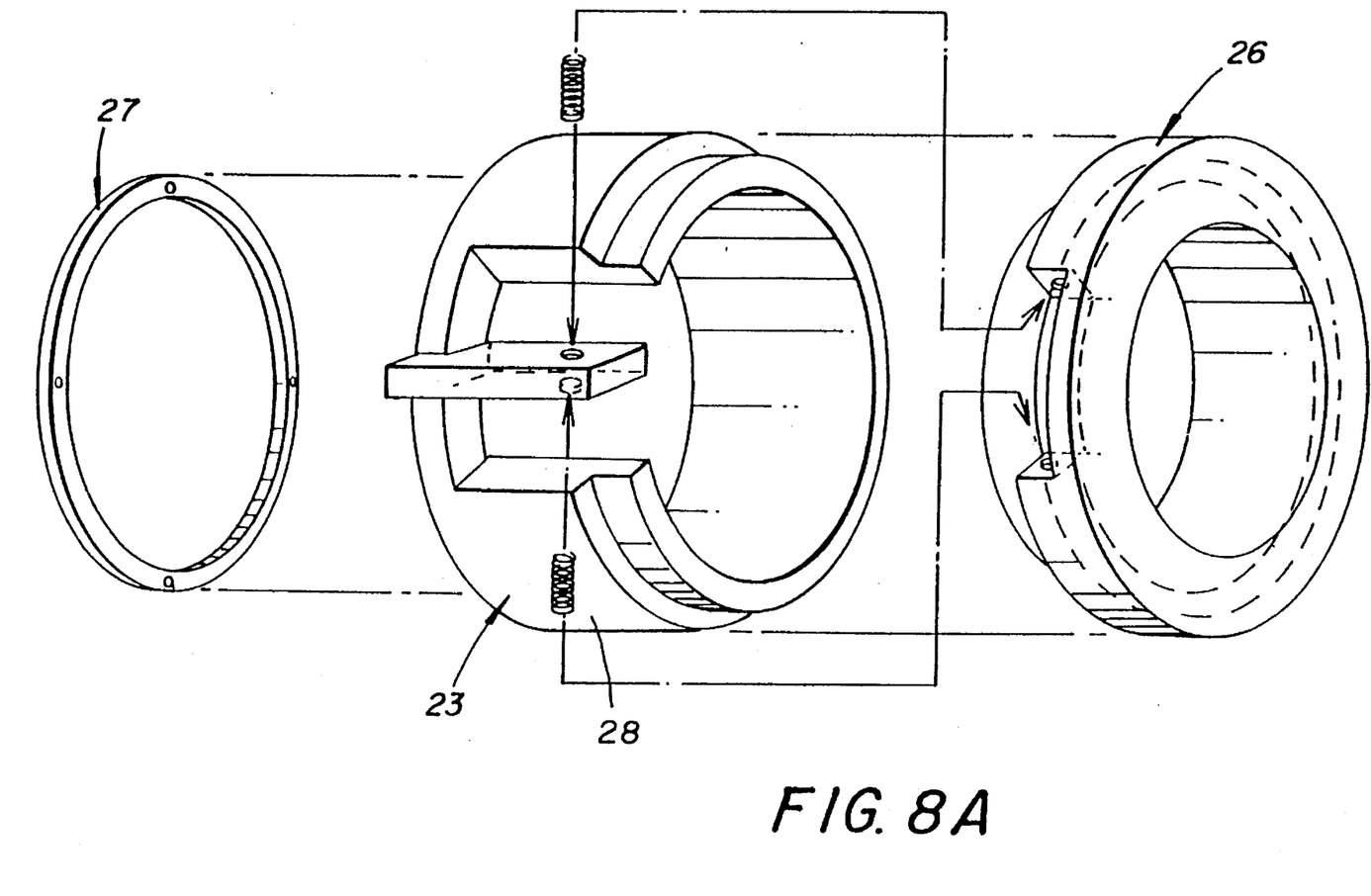
FIG. 8A is an exploded view showing the components of FIG. 8.
Figure 9:
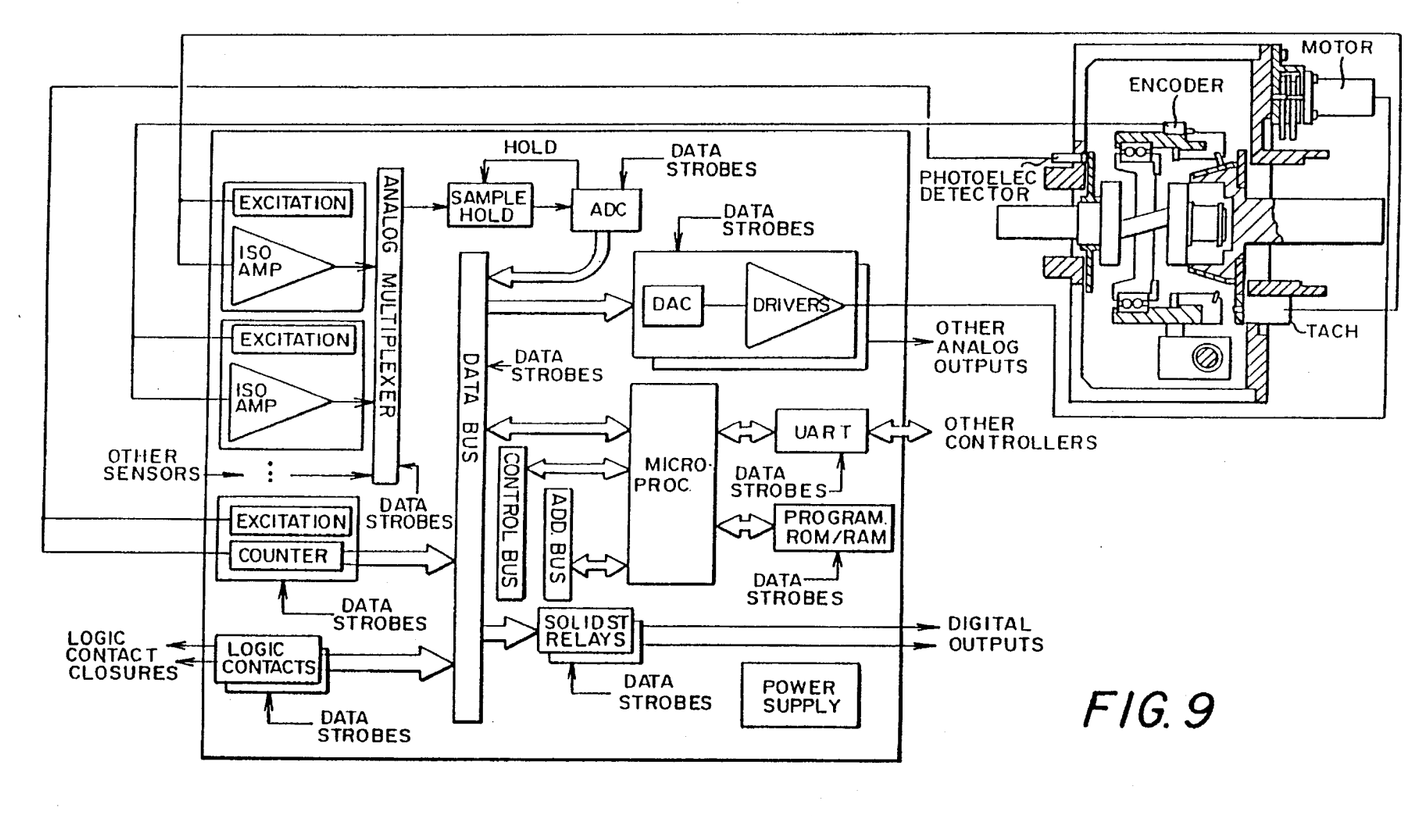
FIG. 9 is a schematic of one embodiment for the control of the effective gear ratio.

When the transmission is operated in a fully adjustable mode per FIG. 5, there are many alternative methods for changing speeds. FIG. 9 illustrates the use of commercially available components to fully automate the transmission shown in FIG. 5. A detector of revolutions per minute ("rpm") 61 is used to measure the rpm of shaft 11. Detector 61 may be a photoelective device responsive to dark or reflective "spots" on a flange 62. Alternatively, magnets and a magnetic sensor may be used. The rpm of shaft 42 may be measured in the same manner or by use of a mechanical tachometer having a pinion gear 65 engaged with a ring gear 63 attached to shaft 42. It is particularly desirable in many applications to be able to determine the value and direction of the torque being transmitted. This may be done using a torque ring as illustrated in FIG. 5, FIG. 8 and FIG. 8A. Torque ring 26 is fixed axially, but allowed to slidably rotate, on collar 23 by retainer 27 and springs 28. Its angular displacement from the initial no load position, which is proportional to the torque being transmitted, is sensed by encoder 66 via pinion 67 and gear segment 68. These outputs, optionally also including a sensor detecting the longitudinal position of the collar relative to the cone, are processed in a CPU and used to locate the collar to achieve intelligent control of effective gear ratio. The program may be soft or embedded. Other inputs may be included in the computation. For example, a throttle position sensor may be used to select a higher (numerical) ratio similar to a step down on a conventional automatic transmission. A brake position sensor in an electric vehicle could maximize the regenerative effect by spinning the motor/alternator at the maximum rate.

The device may be used with a separate clutch when combined with a motor which runs continuously, such as a gasoline or diesel engine. Alternatively, the device may also be used as a clutch. Declutching is achieved by moving the collar away from the conical element so that contact is broken.

Figure 7:
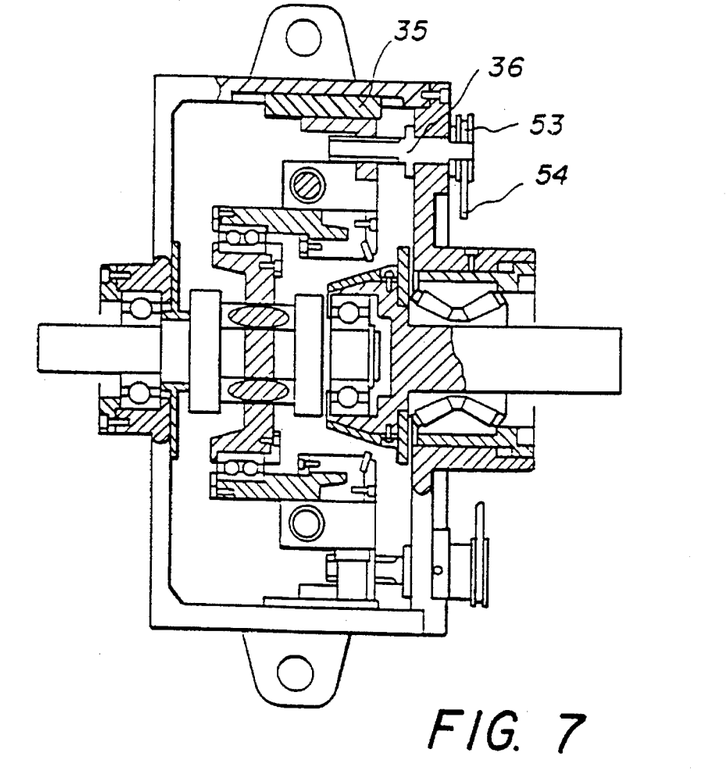
FIG. 7 shows the detail for connecting the gyratory collar to the adjustment mechanism.

When the device is used as both a clutch and a transmission or when more than a few horsepower are being delivered, it is necessary to eliminate vibration or shudder. This may be accomplished in several ways. Two or more springs may be used to urge frame 14 toward end plate 2. Alternatively, or in addition, a torque ring and spring shock absorber as shown in FIGS. 7 and 8 may be used. When torque ring 26 carries the friction ring 24 and is slidably connected to collar 23 through circular, spring loaded element 28, it serves to both measure and damp torque loading.

I claim:

1. A transmission comprising:

a housing;

a first shaft rotatably supported by the housing;

a second shaft rotatably supported by the housing, wherein the first and second shafts are collinear and coaxially aligned about a main axis;

at least one inclined rod operatively connected to said first shaft;

an offset plate operably connected to said inclined rod;

a collar member operably connected to said offset plate having projections directed away from said first shaft and bearing a friction material on said projection;

a guide for controlling the movement of said collar member in a gyratory pattern, wherein the guide prevents the collar from rotating but allows gyration about the main axis;

a conical element operably connected to the second shaft; and means for moving said collar member along the main axis.

2. A transmission according to claim 1, wherein one end of the inclined rod is connected to the first shaft and another end of the inclined rod is rotatably supported by the conical element.

3. A transmission according to claim 1, wherein said collar member has a diameter greater than the diameter of said conical element.

4. A transmission according to claim 1, wherein said means for moving said collar member along said main axis is an externally adjustable screw.

5. A transmission according to claim 1, wherein said means for moving said collar member along said main axis moves the collar member in response to sensed torque at said second shaft.

6. A transmission according to claim 1, further comprising a torque ring rotatably connected to the collar member, wherein torque is sensed by measuring the angular displacement of the torque ring relative to the collar member.

7. A transmission according to claim 1, wherein said guide is connected to the collar member moving means.

8. A transmission according to claim 1, wherein said means for moving said collar member along said main axis moves the collar member in response to sensed angular velocity of at least one of said first and second shafts.

9. A transmission according to claim 1, wherein the guide comprises at least two bearings connected to the collar member and at least two rods slideably passing through the bearings, the two rods being perpendicular to each other so as to permit the collar member to translate in combinations of two perpendicular directions to produce the gyratory pattern about the main axis.

10. A transmission according to claim 9, wherein the guide is connected to the collar member moving means.

11. A transmission according to claim 10, wherein the collar moving means comprises externally adjustable screws.

12. A transmission according to claim 11, wherein rotation of the adjustable screws are selectively controlled by a motor.

13. A variable ratio transmission comprising:

a housing;

a first shaft rotatably supported by the housing and rotatable about a first axis;

a second shaft rotatably supported by the housing and rotatable about a second axis, wherein the first and second axes are collinear and coaxially aligned about a main axis;

at least one inclined rod coupled to the first shaft;

a collar member collinearly positioned between the first and second shafts;

an offset plate operatively coupled to the inclined rod and coaxially mounted to the collar member, wherein the offset plate is rotatable relative to the collar member;

a conical element collinearly and concentrically coupled to the second shaft;

a friction material held by the collar member, the friction material projecting toward the main axis and engageable with the conical element;

a guide for holding and restraining the collar member but permitting the offset plate to rotate relative to the collar member and enabling the collar member and the offset plate to gyrate together about the main axis; and an adjusting device for moving the guide holding the collar member and the offset plate along the main axis to and away from the conical element, wherein rotation of the first shaft at a first speed rotates the inclined rod at the first speed, which rotates the offset plate, whereupon the guide prevents the collar member from rotating, causing the collar member and thus the offset plate together to gyrate about the main axis, which rotates the conical element through the friction coupling and thus the second shaft at a second speed different from the first speed, wherein the second speed is variable by moving the friction material relative to the conical element along the main axis.

14. A variable ratio transmission according to claim 13, wherein the rod has a third axis inclined with respect to the main axis about a first acute angle and wherein the conical element tapers about a second acute angle relative to the main axis, wherein the first acute angle is substantially equal to the second acute angle.

15. A variable ratio transmission comprising:

a housing;

a first shaft rotatably supported by the housing about a first axis;

a second shaft rotatably supported by the housing about a second axis, wherein the first and second axes are collinear and coaxially aligned with a main rotation axis;

at least one inclined rod coupled to the first shaft, wherein the rod has a third axis inclined with respect to the first axis;

a collar member collinearly positioned with the first and second shafts, the collar member having a first end and a second end opposite the first end, the first end being closer to the first shaft than the second shaft and the second end being closer to the second shaft than the first shaft;

an offset plate operatively coupled to the inclined rod and coaxially mounted to first end of the collar member, wherein the offset plate is rotatable relative to the collar member;

a conical element collinearly and concentrically coupled to the second shaft;

a friction material connected to the second end of the collar member, the friction material projecting substantially toward the main axis and engageable with the conical element;

a guide for holding and restraining the collar member but permitting the offset plate to rotate relative to the collar member and enabling the collar member and the offset plate to gyrate together about the main axis, the guide comprising at least two bearings connected to the collar member and at least two rods slideably passing through the bearings, the rods being perpendicular to each other; and an adjusting device for moving the guide holding the collar member and the offset plate along the main axis to and away from the conical element, wherein rotation of the first shaft at a first speed rotates the inclined rod at the first speed, which rotates the offset plate, whereupon the guide prevents the collar member from rotating, which causes the collar member and thus the offset plate together to gyrate about the main axis, which rotates the conical element through the friction coupling and thus the second shaft at a second speed different from the first speed, wherein the second speed is variable by moving the friction material relative to the conical element along the main axis.

16. A variable ratio transmission according to claim 15, wherein the guide comprises first and second pairs of parallel rods slideably passing through the bearings, the first pair of parallel rods being perpendicular to the second pair of parallel rods, the first and second pair of rods enabling the collar member to translate in combinations of two perpendicular directions and enabling the collar member to gyrate.

* * * * *